Sept. 17, 1957  R. N. CLOSE  2,807,017
RADIO COMPUTER SYSTEM
Filed March 26, 1946
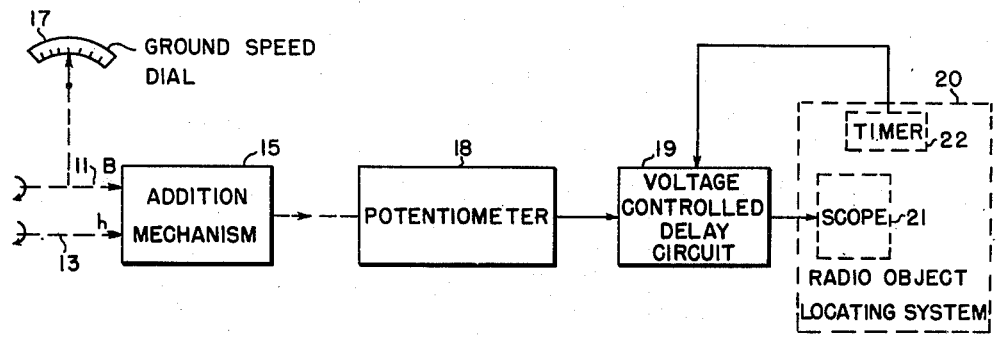
INVENTOR.
RICHARD N. CLOSE
BY
William D. Hall.
ATTORNEY

United States Patent Office 2,807,017
Patented Sept. 17, 1957

2,807,017

RADIO COMPUTER SYSTEM

Richard N. Close, Mineola, N. Y., assignor to the United States of America as represented by the Secretary of War Application March 26, 1946, Serial No. 657,301

3 Claims. (Cl. 343—13)

This invention relates, in general, to electrical apparatus and more particularly to computers for, and methods of bombing.

When bombing a ground target from an aircraft in motion the proper slant range from the target to the correct bomb release point is a function of ground speed of the plane, the altitude of the plane, the air speed of the plane, and the type of bomb used. Heretofore the slant range has been obtained from a table or a computer utilizing the known information such as the ground speed, air speed of the plane and the type of bomb and utilizing the altitude of the plane as determined in various manners. It will be appreciated therefore that errors in computing altitude accurately definitely affected the precision with which bombing operations were carried out. Accordingly, it is one of the objects of my invention to provide a method and apparatus for carrying out the method whereby the effect of such errors on the bombing precision will be minimized.

Since bombing usually takes place at a considerable altitude and, since, in using radio object locating apparatus in the determination of the position of the target to be bombed, it is necessary to radiate electromagnetic energy and to have a portion of the energy so radiated returned to the plane, the first signal which is returned to the plane should be from the object closest to the plane and this will be the ground immediately thereunder. Accordingly this returned signal is an indication of the altitude of the plane above ground and will be referred to hereinafter in the specification as the ground signal. It is accordingly another of the objects of my invention to utilize the action of the radiating apparatus to its fullest extent in providing accurate information for precision bombing.

The radiation of electromagnetic energy for the purpose of locating objects in the vicinity of the plane takes place in the form of short pulses. At the time of the radiation of one of these pulses of energy, there is an indication thereof that appears on the reproducing face of oscilloscope apparatus associated with the radiating apparatus. Such a pulse is termed a transmitted main pulse. It will be appreciated that energy reradiated from objects in response to the action of the radiated energy also will be indicated on the oscilloscope and the position of such an indication with respect to the main transmitted pulse will also give an indication of the distance or range of the object with respect to the then position of the plane carrying the apparatus. Accordingly, if some mark can be registered on the reproducing face of the oscilloscope representing the proper slant range from the plane to a desired target, it will be evident that coincidence of the position of the indication on the oscilloscope of energy reradiated from the proper target with the mark of the proper slant range will take place when the plane is at the proper bomb release position. This will be illustrated hereinafter in this specification. Accordingly, it is another of the objects of my invention to provide an arrangement whereby an indication of the proper slant range will be made on oscilloscope apparatus in the plane before and during the bombing run of the plane.

Heretofore, the method of providing an indication on the oscilloscope reproducing face of the proper slant range has in general consisted in the steps of determining the altitude of the plane and utilizing this value of altitude to obtain slant range from tables, charts or a computer, utilizing of course the known factors such as the speed of the plane and the type of bomb. The altitude then has been a major factor in determining the proper slant range and errors in computing the altitude have had a major effect on the accuracy of the bombing. On the other hand, the relationship of the proper slant range to altitude has been found to be of tremendous importance and accordingly, it is another of the objects of my invention to utilize the relationship between the proper slant range and the altitude to a major degree in a system for and method of accomplishing precision bombing and thereby render the accuracy of bombing relatively independent of altitude computing errors.

The relationship between the proper slant range for release of the bomb and the altitude of the plane will be referred to hereinafter in the specification by the relationship $$B = r - h$$

where $r$ is the proper slant range, and
$h$ is the altitude of the plane above the ground, and B is a factor corresponding to the algebraic difference in the distance between aircraft and target minus the altitude of the aircraft, at the proper release point for the bomb It will be assumed that during the calculation of altitude referred to hereinbefore the plane will make an approach run maintaining substantially the same altitude and, therefore, the approximate value of proper altitude may be obtained and utilized prior to the actual time of release of the bomb.

Although it appears from the relation, $B = r - h$, that B is a function of $h$, it has been found that for altitudes above a few thousand feet that the curve plotting the relative values of $r - h$ against $h$ is relatively flat; i. e. the changes in slant range, $r$, for different altitudes almost exactly compensate for changes in altitude, $h$, thereby rendering B nearly independent of $h$. Accordingly it will be appreciated that this will minimize the effect of errors in measuring the altitude of the plane during the approach run. This fact is utilized in the application of Byron L. Havens, Serial No. 608,317, filed August 1, 1945, now Patent No. 2,699,545, patented January 11, 1955, wherein a voltage proportional to the measured altitude is developed, and is impressed on a voltage controlled delay circuit for the purpose of developing a control which will give an indication of the altitude of the plane on the screen of a cathode ray tube. This indication or altitude mark should coincide with the position of the first received pulse indicated on the oscilloscope tube. A portion of the output of this delay circuit is impressed on a second voltage controlled delay circuit, onto which circuit is also impressed a voltage proportional to B. The output of the second delay circuit will produce a mark on the oscilloscope screen indicative of the proper slant range. The signal returned from the target will change in position as the plane advances and, accordingly, when its position is coincident with that of the slant range mark, the plane is at the proper point of release for the bomb.

It will be seen that in the system just described, the accuracy of the slant range mark will depend on the setting of the altitude mark and the linearity of the two delay circuits. Accordingly it is a further object of this invention to provide a bombing system which will further minimize errors by simplification of apparatus through utilization of less circuit components than the Havens' system; e. g., less delay circuits.

In general, this invention utilizes an addition mechanism coupled to a potentiometer whose output is applied to a voltage controlled delay circuit. This system is used in conjunction with a radio object locating system, and a trigger coincident with the transmitted pulse of said latter system is applied to the delay circuit. One input to the addition mechanism sets in the B factor, such input being coupled to a dial calibrated in ground speed. The other input to the addition mechanism sets in h. The output of the delay circuit is applied to an oscilloscope.

The method employed comprises turning the ground speed shaft to zero and turning the altitude shaft until the delayed mark coincides with the first returned ground signals. Then the ground speed shaft is turned until a correct reading of ground speed is read on the dial. This automatically sets in the correct value of B to the addition mechanism, producing a mark on the oscilloscope indicative of the correct slant range. Ground speed dials are made interchangeable, each dial being calibrated according to a particular indicated air speed, and a particular bomb type.

Other objects, features and advantages of this invention will suggest themselves to those skilled in the art, and will become more apparent from the following description of the invention, taken in connection with the accompanying drawing in which the sole figure is a schematic block diagram of the invention.

Referring now to the drawing, ground speed shaft 11 and altitude shaft 13 are mechanically coupled to an addition mechanism 15 which may be any one of a number of known differential gear-type shaft rotation additive cells as, for example, that shown in Fig. 4 of the patent of A. M. Grass, Patent No. 2,573,840, patented November 6, 1951. Ground speed shaft 11 is also coupled to a dial 17. The output of the addition mechanism 15 preferably in the form of a rotatably displaceable member is mechanically coupled to the sliding contact of a potentiometer 18 whose output is applied to a voltage controlled delay circuit 19. Potentiometer 18 may be of any suitable type as, for example, either one of those shown in Fig. 4 of the Havens patent. A trigger coincident with the transmitted pulse of an associated radio object locating system or device 20 is also applied from the timer circuit or means 22 to the delay circuit 19. The timer 22 may take the form of a blocking oscillator which provides a sharply defined output trigger pulse when a control pulse such as the transmitted pulse is applied thereto. A representative blocking oscillator is shown on pages 2–83 of the book entitled "Principles of Radar" (M. I. T. Radar School Staff, McGraw-Hill, 1946). The output of the delay circuit 19 is applied to the oscilloscope 21 in the radio object locating device 20.

In operation, potentiometer 18 is set at a particular value due to the settings of shafts 11 and 13. This impresses a corresponding particular voltage on delay circuit 19, causing the trigger from the associated radio object locating device to be delayed a predetermined amount. This causes a delayed mark to appear on the scope of the radio object locating device. The delay circuit might be, for example, similar to the delay circuit described in the patent of Byron L. Havens referred to hereinbefore, wherein a trigger pulse applied to said circuit will be delayed a particular time depending on the value of a direct current voltage impressed on said circuit, in this case the voltage from the potentiometer.

When preparing to bomb a target, the operator determines the ground speed and ground track by noting the change of the relative positions of the target on the scope as the plane advances. A so-called drift angle marker might be used to indicate the ground track on the scope. The relationship of the various markers may be similar, for example, to that shown in Fig. 6 of the afore-mentioned Havens patent. Next, the ground speed shaft 11 is turned to zero reading of the dial 17 and the altitude shaft 13 is turned until the delayed mark on the scope coincides with the first returned ground signals. The proper value of $h$ will then be set in to the addition mechanism 15. Next, the ground speed shaft 11 is turned until a correct reading of ground speed is indicated on dial 17. The ground speed dial 17 is calibrated so that when a correct ground speed reading is obtained, the proper value B is introduced into the addition mechanism 15. Since B is a function not only of ground speed but, also, indicated air speed and bomb type, only one dial may be used for a particular indicated air speed and a particular bomb type. Therefore, several dials should be provided or used to meet differing conditions, and such dials are made readily interchangeable.

With B and $h$ values applied to the addition mechanism in accordance with the above, a slant range mark will appear on the scope. When the plane advances to a point at which time the slant range mark and the target mark coincide, the bomb or bombs are released.

It will be seen then that the $h$ component is set in with a high degree of accuracy that is independent of any errors in the mechanical system, in the potentiometer, or in the delay circuit. The only requirement, then, is that the rate of change of delay of the delay circuit be fairly linear at the point where B is set in.

The principle involved in this system is that B is a function only of ground speed and bomb type, and independent of wind and altitude within an error of approximately 70 yards over a range of 5,000 to 40,000 feet altitude.

By indicated air speed is meant the speed as indicated by a Pitot tube. If the indicated air speed is held constant, the actual air speed increases as the altitude increases, and the density of the air decreases. It has been found, however, that if the indicated air speed is held constant, optimum performance is obtained at all altitudes at the corresponding true air speed. For that reason, it has been found possible in two given types of aircraft, to use a single ground dial corresponding to the type of bomb carried.

While there has been described what is at present considered to be the preferred embodiment of this invention, it will be obvious to those skilled in the art that various changes and modifications may be made therein without departing from the spirit and scope of the invention.

What is claimed is:

1. In a computing system borne in an aircraft and including a radio-object locating system having an indicator therein and producing a trigger pulse coincident with the transmitted pulse, delay means coupled to said radio-object locating system and to said indicator responsive to said trigger pulse for producing a delayed marker on said indicator, said delay means being adapted to delay said marker by an amount controlled by an input voltage, variable means for applying said input voltage to said delay means, first and second rotatable shaft means, addition means coupling both said shaft means to said variable means, said addition means serving to add the rotations of said shaft means to cause said variable means to produce a voltage proportional to the sum of said rotations, and ground speed indicating means coupled to said first shaft means in order that said first shaft means may be set to a position such that the ground speed shown upon said ground speed indicating means is zero and said second shaft means may be rotated until said marker is coincident with the first ground echoes depicted upon said indicator, resulting in a marker serving to accurately calibrate the rotation of said second shaft means and said variable means in terms of the altitude of said aircraft, and said first shaft means may then be rotated to add to said addition means a rotation proportional to the slant range of a given target minus the altitude of said aircraft, resulting in a marker indicating said slant range.

2. A radio computing system for an aircraft having a radio object locating system with a transmitter and indicator therein, said radio computing system comprising: delay means for joining said transmitter to said indicator so that said indicator produces a marker for each pulse transmitted by said transmitter, said delay means producing a delay in said marker which is a function of an input voltage; voltage means for applying a voltage to said delay means that is a function of an input shaft rotation; addition means for producing an input shaft rotation to said voltage means that is the sum of two input shaft rotations to said addition means; an altitude shaft for producing one input shaft rotation to said addition means; a ground speed shaft for producing the other input shaft rotation to said addition means; shaft rotation indicating means for producing an indication that is a function of the rotation of said ground speed shaft; and a dial operatively associated with said shaft rotation indicating means and calibrated in ground speed in a manner such that when the altitude shaft is rotated to a position, with the ground speed shaft at a zero position, where the marker on said indicator coincides with the marker produced by the received ground echoes, and the ground speed shaft is then rotated so that the ground speed of the aircraft is indicated on said dial by said indicating means, the marker on said indicator will be indicative of the correct slant range.

3. A radio computing system for an aircraft having a radio object locating system with a transmitter and indicator therein, said radio computing system comprising: means connected to said transmitter for producing a trigger pulse simultaneously with the transmission of a radar pulse; delay means for delaying said trigger pulse by a time that is dependent upon the magnitude of an input D. C. voltage; leads for conducting the output delayed trigger pulse from said delay means to the input pulse terminal of said indicator whereby said indicator produces a marker from said delayed trigger pulse; a potentiometer having a resistance coil and a movable arm for slidable movement over said resistance coil; leads for joining said resistance coil across a source of D. C. voltage; leads for connecting the arm and one end of the coil of said potentiometer to the input of said delay means; a driving shaft joined to the arm of said potentiometer; an altitude shaft; a ground speed shaft; gear means connected to produce a rotation of said driving shaft which is a summation of the rotations of said altitude shaft and said ground speed shaft; a pointer arm; means for connecting said pointer arm to said ground speed shaft such that the movement of the pointer arm corresponds to the rotation of the ground speed shaft; a dial in operative association with said pointer arm and calibrated in ground speed in a manner such that with the ground speed shaft in a non-rotated position, when the altitude shaft is rotated to a position where the marker on said indicator coincides with the marker produced by the received ground echoes, and the ground speed shaft is then rotated so that the ground speed of the aircraft is indicated on said dial by said indicating means, the marker on said indicator will be indicative of the correct slant range.

References Cited in the file of this patent

UNITED STATES PATENTS

| | | |
|---|---|---|
| 2,070,178 | Pottenger et al. | Feb. 9, 1937 |
| 2,405,238 | Seeley | Aug. 6, 1946 |
| 2,408,048 | Deloraine et al. | Sept. 24, 1946 |
| 2,409,462 | Zworykin et al. | Oct. 15, 1946 |
| 2,416,223 | Sanders | Feb. 18, 1947 |
| 2,422,025 | Luck | June 10, 1947 |
| 2,430,292 | Hershberger | Nov. 4, 1947 |
| 2,433,284 | Luck | Dec. 23, 1947 |
| 2,444,678 | Sanders | July 6, 1948 |
| 2,454,009 | Sanders | Nov. 16, 1948 |
| 2,600,428 | Pooler et al. | June 17, 1952 |